Feb. 5, 1929.
K. F. NYSTROM
1,701,010
RAILWAY JOURNAL BEARING
Filed Oct. 2, 1922
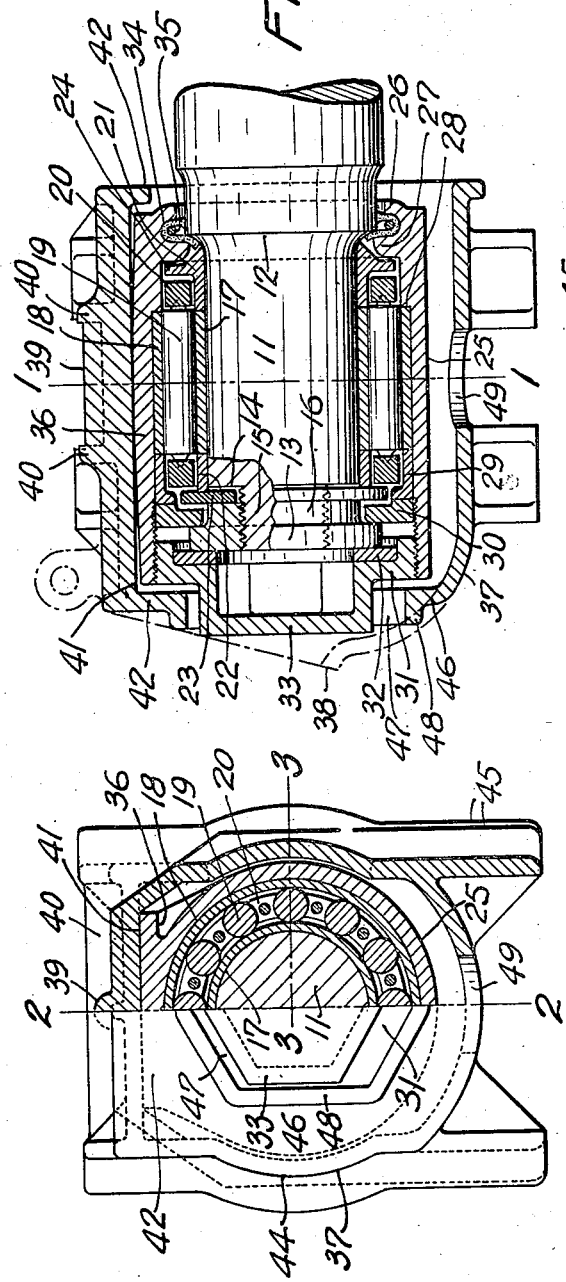
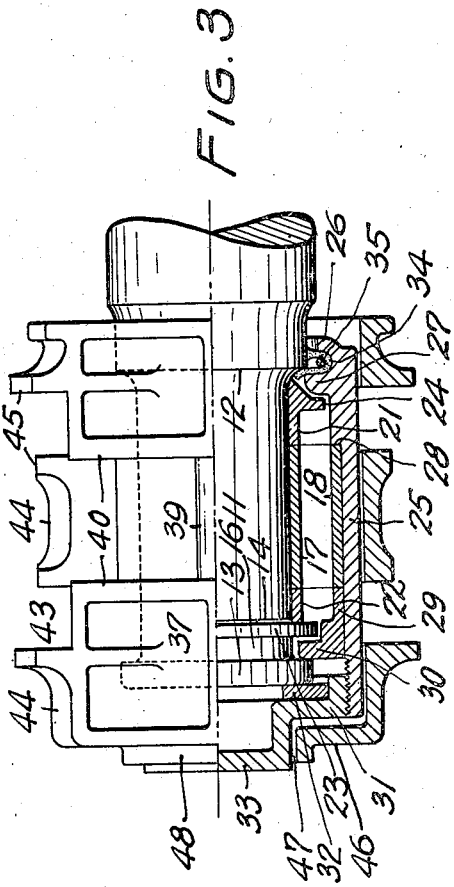
Inventor
Karl F. Nystrom
By Patented Feb. 5, 1929.

1,701,010

UNITED STATES PATENT OFFICE.

KARL F. NYSTROM, OF CHICAGO, ILLINOIS.

RAILWAY JOURNAL BEARING.

Application filed October 2, 1922. Serial No. 591,913.

This invention relates to improvements in anti-friction bearings of the roller or ball type, and more particularly bearings of this class especially designed for railway service, and the principal object of the invention is to provide a ball or roller bearing adapted for use with journals and journal boxes of standard outside dimensions, whereby the bearing may be applied to existing trucks and the like.

A further object is to provide a bearing which may be readily assembled upon a journal and within a journal box.

Another object is to provide adjustable end thrust means which will permit the taking up of wear and the limiting of end play, and also means for taking up wear or slackness in tapered roller bearings if such are used.

Still another object is to provide bearings so constructed that the adjusment for end play is automatically locked by the assembling of the bearing in the journal box to the end that the adjustment cannot be destroyed accidentally, maliciously or through ignorance.

A further object is to provide a dust-proof bearing.

Various other objects and advantages will be ascertained from the following description.

The device consists briefly of a bearing proper comprising inner and outer raceways between which anti-friction balls or rollers are mounted, the said bearings being applicable to a railway car journal of standard dimensions by a special formation of the journal end which permits the outer end flange to be removed for application of the bearing and replaced to hold the bearing on the journal. The bearing is mounted in a specially formed casing provided at the inner end with efficient dust rings and at the outer end with a closure member adapted to engage the end of the journal to limit end play in one direction, while the body of the casing carries means engaging the journal to limit end play in the opposite direction. The closure member is polygonally formed for co-operation with a polygonal opening in a suitable journal box, so that when the two are assembled the closure, which adjusts end play, is locked by its engagement with the journal box.

In the drawings which illustrate one embodiment of the invention:—

Fig. 1 is a half end elevation and half vertical section on the line 1—1, Figure 2.

Fig. 2 is a vertical longitudinal section on the line 2—2, Figure 1.

Fig. 3 is a half plan view and half horizontal section on the line 3—3, Figure 1.

Referring more particularly to the drawings, 11 designates a journal formed on a standard railway axle and having at its inner end the usual shoulder 12 and at its outer end the usual flange 13. For the purposes of this invention the end of the axle is shouldered at 14 a short distance from the flange 13, thus providing a reduced portion 15 which is threaded for the reception of a collar 16 which carries the flange 13, the collar being preferably shorter than the portion 15, so that when the collar is screwed on flush with the end of the axle a space will be left for the reception of a member hereafter described. Any suitable form of locking means (not shown) may be provided to releasably lock the collar against rotative movement.

The bearing proper comprises inner and outer race-ways 17 and 18 respectively which are of any suitable form according to the anti-friction means employed and which, in the embodiment illustrated, is a series of rolls designated 19 disposed between and having engagement with the race rings. The rolls 19 may, if desired, be mounted in a cage, designated as a whole by the numeral 20.

The bearing is positioned on the journal by means of inner and outer spacing rings 21 and 22 respectively and a washer 23 surrounding the reduced axle portion 15 and held in place by the collar 16. The inner spacing ring 21 is suitably formed to bear against the shoulder 12 of the axle, while the outer spacing ring 22 is held in compression between the inner race 17 and the washer 23. The inner spacing ring 21 may be provided with a radially projecting flange 24 and the washer 23 preferably projects radially beyond the spacing ring 22, both as shown in Figure 2 and for the purpose of confining the bearing cage 20 and limiting movement thereof longitudinally of the axle. It will be noted that the recess between the axle shoulder 14 and the inner end of the collar is greater than the thickness of the washer, as clearly shown in Figure 2, so that the pressure imposed by tightly screwing on the collar 16 will effectually clamp the inner race ring to the axle and hold the same against rotation independently of the axle. In this manner wear of the axle is eliminated. The inner race ring and spacing rings are of course snug fits upon the journal so as to maintain absolutely concentric relations therewith and avoid wear of the ends of these rings which would follow any looseness, also the rolling-out action which would occur.

The bearing is contained in a casing 25 in which the outer race ring is a snug fit. The inner end of the casing is provided with an internal flange 26 which approaches the axle inside the shoulder 12. A short distance outside the flange 26 the casing is provided with a second internal flange 27 lying outside the shoulder 12 and approaching the journal. The inner end of the outer race ring 18 is spaced from the flange 27 by any suitable means presenting a shoulder 28 for abutment by the inner end of the race ring. While this spacing means has been shown integral with the casing, it will be understood that this is not essential. The outer race ring is also positioned by a spacing ring 29 at its outer end engaging an anti-friction washer 30 which interdigitates with the journal flange 13 and washer 23. The members 29 and 30 may be separate as shown in Figure 2 or may be formed integral as shown in Figure 3. The outer end of the casing is internally threaded to receive a threaded end closure or cap 31 which carries an inserted anti-friction washer 32 adapted to engage the outer end surface of the flange 13. The thread may be extended inwardly to permit of screwing in the collar 30 but the collar may be a slip fit. The cap 31 is provided with an outwardly projecting, centrally disposed portion 33 of polygonal formation, for example hexagonal as shown. It will be readily seen that the anti-friction washer 30 is held against inward movement by the race ring 18 and spacing ring 29 so that when the journal end collar 16 is in place the bearing and its casing are held against withdrawal over the end of the axle. In other words, end play of the axle in one direction in the bearing is thus limited. The screwing in of the cap 31 and the thickness of the washer 32 determine the inward movement of the bearing and casing on the axle and determine the end play of the axle in a direction opposite to the first. In this way end play may be entirely eliminated or the amount thereof accurately determined by the screwing in or out of the end cap 31. Wear of the end thrust washers 30 and 32 may be taken up by adjustment of the cap 31 and new washers may be inserted by removing the end cap and journal collar 16.

In the space between the casing flanges 26 and 27 a dust collar 34 of felt or other suitable material may be secured by means of an expansible split ring 35 which sinks into the dust collar intermediate the edges thereof bending the same to the U-shaped cross section illustrated and bringing one edge of the collar into engagement with the axle inside the shoulder 12 and the other edge into engagement with the shoulder itself. This latter or outer edge of the dust collar is in compression between the shoulder 12 and the casing flange 27 and is held against the shoulder by the flange. Pinching or cutting off of the dust collar by the shoulder and flange is prevented by proper adjustment of the end cap and by proper thickness of anti-friction washers which limit the end play of the axle in the bearing. This form of dust collar is very efficient. The inner edge bears against the axle and prevents the entrance of the greater portion of grit, while the outer edge of the washer bearing tightly against the shoulder 12 and in spaced relation from the inner edge will stop any grit which may pass the outer edge of the collar. Owing to the snug fit of the race rings on the journal and in the casing the casing is maintained absolutely concentric with the axle and any eccentric movement which would reduce the efficiency of the dust collar is thus effectually prevented. In addition to the foregoing, the permanently maintained engagement of the dust collar with the journal shoulder 12 constitutes a seal effective to retain oil or grease in the casing.

The casing is substantially cylindrical in form and provided with a longitudinally disposed and substantially flat rocker plate 36. This plate is flat in the transverse direction of the casing, as shown in Figure 1, and very slightly curved in the longitudinal direction, as shown in Figure 2, so as to hold the casing positively against rotation about the axle but at the same time to permit a slight rocking movement in the plane of the axle.

The casing is housed in a journal box 37, the essential external dimensions of which are in accordance with accepted standards so as to be interchangeable with ordinary journal boxes in a truck frame. The small amount of departure from standard dimensions is shown in Figure 2 by a super-position in broken lines of a standard journal box as indicated at 38, and it will be observed that the journal box according to this invention lies within the dimensions of the standard box and departs therefrom only in unimportant particulars. The top of the box is formed in accordance with the type of truck in which it is to be used. In the embodiment illustrated the box is adapted for passenger car service and is provided on the top with a longitudinal rib 39 between flanges 40 for the reception of an equalizer. The inner surface of the box top, designated 41, is flat and forms a tread plate for the rocker plate 36 of the bearing casing which engages at its longitudinal edges with the sides of the box and is thus restrained from rotative motion. At the inner and outer ends of the box depending flanges 42 or their equivalent hold the casing against material longitudinal movement in the box. At the sides of the box vertically disposed grooves 43 are provided for the reception of pedestals or truck bolts. Owing to the type of bearing employed the horizontal dimension at the centre is greater than in ordinary practice and it is therefore found necessary to curve the sides of the box outwardly as at 44. This outward curvature causes the bottoms of the grooves to intercept the inner surface of the side walls, so that openings are provided through the sides of the journal box as shown in Figures 1 and 3. Such openings would be prohibitive in ordinary boxes but are immaterial in the present invention as the journal box does not form a receptacle for lubricant and is not necessarily closed to exclude grit. The cutting away of the box side walls which form these openings enables the entire space between pedestal or truck bolts to be used for the bearing and thus enables the maximum size of bearing to be employed. Weakening of the box as a result of the openings is of no moment as the strength may be made up by suitable heavy flanges 45 flanking the openings and guide grooves.

At the outer end of the box a wall 46 is provided having a polygonal opening 47 therein for the reception of the polygonal cap portion 33. Preferably the horizontal dimension of this opening is very slightly greater than the horizontal dimension of the part 33, while the vertical dimension of the opening is considerably greater both to permit of rocking movement of the bearing in the box and to enable the box to be lifted sufficiently to clear the inner end flange 42 from the casing rocker 36 for purposes of removal. The opening 47 is preferably surrounded by a heavy flange 48 which serves both to strengthen the end wall and to protect the part 33 from damage by contact with any object close to the track when the bearing is in operation. An opening 49 may be provided in the bottom of the box for the escape of foreign matter, particularly water.

The bearing is assembled into a truck as follows:—The end collar 16 is removed from the axle. The inner spacing ring 21 is inserted in the casing 25 and the bearing proper comprising the inner and outer race rings, rolls and cage is next inserted in the casing. The spacing ring 29, if separate from the thrust washer 30, may also be inserted. The casing with its contents is then slipped over the end of the axle and the outer spacing ring 22 applied, either with the casing and bearing or afterwards. The locking washer 23 is next put in and then the thrust washer 30 followed by the journal collar 16 which is screwed sufficiently tight to hold the bearing rigidly to the axle. With properly dimensioned parts and proper adjustment the thrust washer 30 will be a nice running fit against the end flange 13 and may be spaced from the washer 23, as shown, although the clearance may be only that necessary for a running fit. In the latter case the collar 16 will serve to seat the race ring 18 on the shoulder 28. The washer 30 may be screwed into or loose in the casing as desired and if screwed in will clamp the race ring 18 independently of the adjustment of the collar 16. The collar is now locked in any suitable way against rotation. The end cap 31 carrying the outer thrust washer 32 is now screwed into the casing until the thrust washer touches or nearly touches the journal end and thus determines the end play, if any, of the journal. If the casing has been moved to separate the washer 30 and flange 13, the screwing in of the cap 31 will draw the casing out until the washer and flange re-engage. With proper adjustment the flange 13 should be a nice running fit between the thrust washers 30 and 32. Ordinarily no end play is allowed as it interferes with the operation of and may possibly damage the dust collar 34. The journal box is now slipped over the end of the casing and dropped into position. The engagement of the cap projection 33 in the open outer end of the journal holds the cap against rotation independently of the journal box, and as the casing is held against rotation in the journal box by the flat engaging surfaces it follows that when the proper adjustments of the bearing have once been made and the bearing assembled in a truck it will be impossible to alter these adjustments except by removal from the truck.

The operation of the bearing will be readily understood from the foregoing description. In brief, the inner race turns with the journal and the outer race remains irrevoluble in the casing, so that there is no slip or wear. End play of the journal in the bearing is preferably eliminated to ensure satisfactory operation of the dust collar. Wear of the thrust rings 30 and 32 may be compensated for by adjustment of the cap 31 to take up the wear until relative axial movement of the journal and casing brings the flanges 24 and 27 into contact when no adjustment is possible and one or more new thrust rings or liners must be inserted. The bearing is free to rock in the journal box in the usual manner. The bearing is, for all intents and purposes, oil-tight and may be filled with heavy oil or grease from which grit is effectually excluded by the dust collar and end cap. The problem of lubrication in service is thus largely eliminated and hot boxes due to defective lubrication or entrance of grit become substantially impossible. Owing to the rolling bearing very little lubrication is in any case required and the reduction of friction reduces the amount of tractive effort required. The flange 27 of the casing will, through the dust collar, or in the absence of the dust collar, engage the shoulder 12 and the ring 30 will engage the flange 13 and hold the journal and casing against relative movement in the axial direction, but preferably the outer end of the flange 13, which for thrust purposes corresponds with the shoulder 12, will receive the thrust and thus relieve the dust collar of pressure.

If tapered rollers are used, such as Timken bearings, any slackness may be taken up by the removal of liners which may be used in connection with the washer 23 or under the washer 32. If it is desired to press or shrink the inner race ring on the journal the flange 24 must be omitted to permit assembly. It will be obvious that the length of the race rings may be increased as desired or to eliminate the spacers 21, 22 and 29, and also that in such case the inner race ring may extend from the shoulder 12 to the flange 13.

While only one embodiment of the invention has been shown and described, it must be understood that the invention is not thus limited but contemplates many modifications of detail, such as type of rolling elements, and such as may be necessary to adapt the invention to varying service conditions.

Having thus described my invention, what I claim is:—

1. In an anti-friction bearing, a shouldered casing, a rolling bearing, an outer race within the casing abutting at its inner end the casing shoulder and of length only sufficient to form a tread for the rolling bearing, a filler ring at the outer end of the race ring projecting radially therebeyond and constituting a bearing retainer, and means for securing said rings in the casing including a cap screwed into the casing and end thrust means interposed between the cap and the filler ring.

2. An antifriction bearing including the combination with a shaft and a rolling bearing thereon, of a washer on the shaft to retain said bearing, a clamping collar for said washer adjustably secured to the shaft, an internally shouldered casing for the bearing, a thrust ring in the casing disposed between the shaft collar and bearing and limiting bearing and casing movement axially of the shaft in one direction, and a second thrust ring adjustably mounted in the casing engaging the opposite side of said first thrust collar from the first thrust ring and limiting movement of the casing axially of the shaft in a direction opposite to the first.

3. In a bearing the combination with a shaft, of a casing including means to seat a thrust ring, a thrust ring in the casing engageable with the seating means, a thrust member secured to the end of the shaft outside of and engaging said thrust ring, and a second thrust ring in the casing outside the thrust member and engageable with the opposite side thereof from the first thrust ring, whereby said thrust member interdigitates and limits relative movement of the shaft and casing in the axial direction and an end cap adjustably secured in the casing and carrying said second thrust ring.

4. A railway journal rolling bearing capable of application to a journal without reduction in the diameter of the journal and without increasing the distance between truck columns or pedestals associated with the journal comprising, an antifriction bearing having a diameter substantially equal to the distance between the truck columns or pedestals and an enclosing box for said bearing to be slidably engaged between the truck columns or pedestals, said box being of greater width than the distance between the columns or pedestals and having the side walls thereof apertured between the bearing and the columns or pedestals to permit entry of the box between the columns or pedestals and close approach of the bearing to the columns or pedestals.

5. A railway journal bearing comprising a shouldered axle including a journal portion beyond the shoulder and a threaded portion of less diameter than the journal portion extending beyond said journal portion, a collar screwed on the threaded portion of the axle including an inner part of the same diameter as the journal portion of the axle and a radially outwardly extending flange at the outer end of said collar, the journal portion of the axle and the collar constituting a journal of standard dimensions in combination with a rolling bearing encircling the journal portion of the axle and held against removal by the flange of the collar.

6. In a railway journal bearing, an axle, a rolling bearing thereon including a casing, a journal box embracing the casing and having a polygonal opening at the outer end, an adjusting means screwed into the bearing casing at the outer end and polygonally formed for non-rotative engagement in the opening of the box, whereby the adjusting means is locked against rotation while assembled in the box and unlocked only upon material relative movement of the box and journal in their axial direction.

7. In a railway journal bearing, a journal box, an axle having a thrust flange, a bearing in which the axle turns including an end cap adjustable by revolution, said bearing and cap being independently irrevolubly related to the journal box, and thrust collars in said bearing disposed on opposite sides of the thrust flange, one of said collars being adjustable by revolution of the end cap whereby the adjustment is normally maintained by engagement of the bearing and cap in the journal box.

8. In combination with a structure according to claim 5, a washer clamped between the outer end of the axle journal portion and the inner end of the collar in spaced relation to the collar flange, and a radially inwardly extending flange included in the rolling bearing and engaged between said washer and the collar flange.

9. A structure according to claim 5, in which the rolling bearing includes rolling elements and an inner race ring of the same length as said rolling elements, in combination with a washer clamped between the journal portion of the axle and the collar, and filling rings between the ends of said inner race ring and the axle shoulder and washer.

In witness whereof I have hereunto set my hand.

KARL F. NYSTROM.